United States Patent
Lyuh et al.

(10) Patent No.: US 8,407,276 B2
(45) Date of Patent: Mar. 26, 2013

(54) APPARATUS FOR CALCULATING ABSOLUTE DIFFERENCE

(75) Inventors: Chun Gi Lyuh, Daejeon (KR); Ik Jae Chun, Daejeon (KR); Jung Hee Suk, Daejeon (KR); Tae Moon Roh, Daejeon (KR); Jong Kee Kwon, Daejeon (KR); Jong Dae Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 438 days.

(21) Appl. No.: 12/843,550

(22) Filed: Jul. 26, 2010

(65) Prior Publication Data

US 2011/0022647 A1 Jan. 27, 2011

(30) Foreign Application Priority Data

Jul. 27, 2009 (KR) .................. 10-2009-0068397
Jun. 16, 2010 (KR) .................. 10-2010-0056982

(51) Int. Cl.
*G06F 7/50* (2006.01)
(52) U.S. Cl. .................. 708/671; 708/201
(58) Field of Classification Search .......... 708/201, 708/671
See application file for complete search history.

(56) References Cited

U.S. PATENT DOCUMENTS

| | | | | | |
|---|---|---|---|---|---|
| 3,755,660 | A | * | 8/1973 | Sather | 340/146.2 |
| 4,218,751 | A | * | 8/1980 | McManigal | 708/201 |
| 4,761,759 | A | * | 8/1988 | Nakagawa | 708/671 |
| 4,953,115 | A | | 8/1990 | Kanoh | |
| 5,610,850 | A | * | 3/1997 | Uratani et al. | 708/671 |
| 5,793,655 | A | * | 8/1998 | Harlap et al. | 708/201 |
| 5,894,426 | A | * | 4/1999 | Ju | 708/207 |
| 5,905,665 | A | * | 5/1999 | Rim | 708/491 |
| 5,944,771 | A | * | 8/1999 | Shiraishi | 708/201 |
| 5,957,996 | A | * | 9/1999 | Shiraishi | 708/201 |
| 6,473,529 | B1 | * | 10/2002 | Lin | 382/236 |
| 7,434,034 | B2 | * | 10/2008 | Selvaggi et al. | 712/221 |

FOREIGN PATENT DOCUMENTS

| | | |
|---|---|---|
| JP | 04-080815 | 3/1992 |
| KR | 100264958 B1 | 8/2000 |
| KR | 1020030011978 A | 2/2003 |
| KR | 1020050053135 A | 6/2005 |

\* cited by examiner

*Primary Examiner* — Chuong D Ngo
*Assistant Examiner* — Kevin G Hughes

(57) ABSTRACT

Provided is an apparatus for calculating an absolute difference capable of efficiently performing an absolute difference using an adder. The apparatus for calculating an absolute difference includes a comparator comparing values of two integers, first and second selectors each selecting and outputting one of the two integers according to the comparison results of the comparator, an inverter complementing the result value selected by the second selector; and an adder adding up the result value selected by the first selector, the value complemented by the inverter, and 1.

8 Claims, 3 Drawing Sheets

APPARATUS FOR CALCULATING ABSOLUTE DIFFERENCE

CROSS-REFERENCE TO RELATED APPLICATION

This application claims priority to and the benefit of Korean Patent Application Nos. 10-2009-0068397 filed Jul. 27, 2009 and 10-2010-0056982 filed Jun. 16, 2010, the disclosure of which is incorporated herein by reference in its entirety.

BACKGROUND

1. Field of the Invention

The present invention relates to an apparatus for calculating an absolute difference, and more specifically, to an apparatus for calculating an absolute difference capable of calculating an absolute difference using an adder.

2. Discussion of Related Art

A conventional arithmetic logic unit (ALU) has performed the various arithmetic operations, which include a subtraction operation in addition to an addition operation and various logical operations, which include a logical sum and a logical product, on the basis of an adder. Meanwhile, in the recurrent applications including the multimedia processing, calculation performance is enhanced by adding calculations of an absolute difference to the ALU in addition to the general operations. The calculation of the absolute difference refers to the calculation of a difference between two integers. The absolute difference between two integers A and B is denoted by $|A-B|$, and there are various methods of processing this calculation in an efficient manner.

FIG. 1 illustrates the configuration of a conventional apparatus for calculating an absolute difference, which implements an absolute difference calculation using two adders and a multiplexer (MUX). As illustrated, in order to calculate an absolute difference between integers A and B, i.e., $|A-B|$, first, the A−B calculation is performed using a NOT operation and addition, and the resultant value, i.e., the value of a temporary variable "TMP," is output. Here, when a code bit of TMP is 0, this denotes a positive number, and thus a final result is output by adding 0 to the value of TMP. Further, when the code bit of TMP is 1, this denotes a negative number, and thus a NOT operation is performed on the value of TMP to calculate an absolute value, and then a final result is output by adding 1 to the value of TMP. As can be seen from FIG. 1, the conventional apparatus for calculating an absolute difference uses two adders and one MUX to calculate the absolute difference.

FIG. 2 illustrates a similar example of calculating an absolute value to that of FIG. 1. FIG. 2 illustrates the configuration of an apparatus for calculating an absolute difference implemented through an XOR operation without an MUX. It may be found that two adders are employed as well.

FIG. 3 illustrates another example of calculating an absolute difference. Here, A+(~B)+1 operation and A+(~B) operation are simultaneously performed using two adders, and the results of A+(~B)+1 operation or (~(A+(~B))) operation are output depending on the presence of overflow. In this case, the two adders are used in the same manner as the apparatus for calculating an absolute difference illustrated in FIGS. 1 and 2.

However, when the apparatus for calculating an absolute difference is implemented according to the configuration illustrated in FIGS. 1 to 3 for the purpose of calculating an absolute difference, two adders are mounted on the ALU of a processor, and this increases the burden on a logic area.

SUMMARY OF THE INVENTION

The present invention is directed to an apparatus for calculating an absolute difference, in which the absolute difference is calculated by adding minimum logics to a conventional arithmetic logic unit (ALU), so that the burden on a logic area may be reduced to efficiently calculate the absolute difference, and at the same time, to add other calculations.

An aspect of the present invention provides an apparatus for calculating an absolute difference including: a comparator comparing values of two integers; first and second selectors each selecting and outputting one of the two integers according to the comparison results of the comparator; an inverter complementing the result value selected by the second selector; and an adder adding up the result value selected by the first selector, the value complemented by the inverter, and 1.

Here, the first selector may select and output the greater of the two integers, and the second selector may select and output the other integer not selected by the first selector.

Another aspect of the present invention provides an apparatus for calculating an absolute difference including: a comparator comparing values of two integers; an exclusive logical sum operator performing an exclusive logical sum operation on the comparison results of the comparator and a first input signal; a first selector selecting and outputting one of the two integers according to the operation results of the exclusive logical sum operator; a second selector selecting and outputting one of the two integers according to the comparison results of the comparator; a first inverter complementing the output of the second selector; a third selector selecting and outputting the result value of the first inverter or "0" according to a second input signal value; a second inverter complementing the second input signal value; and an adder adding up the output of the first selector, the output of the third selector and the output of the second inverter.

In the above constitution, when both the first and second input signals are "0", the adder may output the results of calculating the absolute difference. Specifically, when both the first and second input signals are "0", the first selector may select and output the greater of the two integers, the second selector may select and output the other integer not selected by the first selector, and the third selector may select and output the result value of the first inverter.

Meanwhile, when the first input signal is "0" and the second input signal is "1", the adder may output the maximum value of the two integers. When the first input signal is "0" and the second input signal is "1", the first selector may select and output the greater of the two integers, and the third selector may select and output "0".

Finally, when the first input signal is "1" and the second input signal is "1", the adder may output the minimum value of the two integers. When the first input signal is "1" and the second input signal is "1", the first selector may select and output the lesser of the two integers, and the third selector may select and output "0".

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF EXEMPLARY EMBODIMENTS

The present invention will be described more fully hereinafter with reference to the accompanying drawings, in which exemplary embodiments of the invention are shown, such that one skilled in the art could have easily embody the invention. This invention may, however, be embodied in different forms and should not be construed as limited to the embodiments set forth herein. In the following description of the present invention, a detailed description of known functions and components incorporated herein will be omitted when it may make the subject matter of the present invention rather unclear. Where the term "comprising" is used throughout the specification, it is intended to denote inclusion of additional components rather than exclusion of any terms, steps or features unless specified to the contrary.

Figure 1:
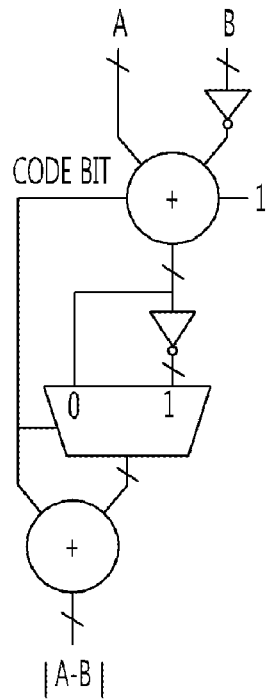
FIGS. 1 to 3 illustrate the configuration of a conventional apparatus for calculating an absolute difference performing an absolute difference calculation using two adders.
Figure 2:
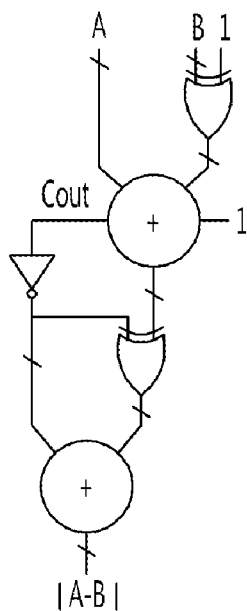
Figure 3:
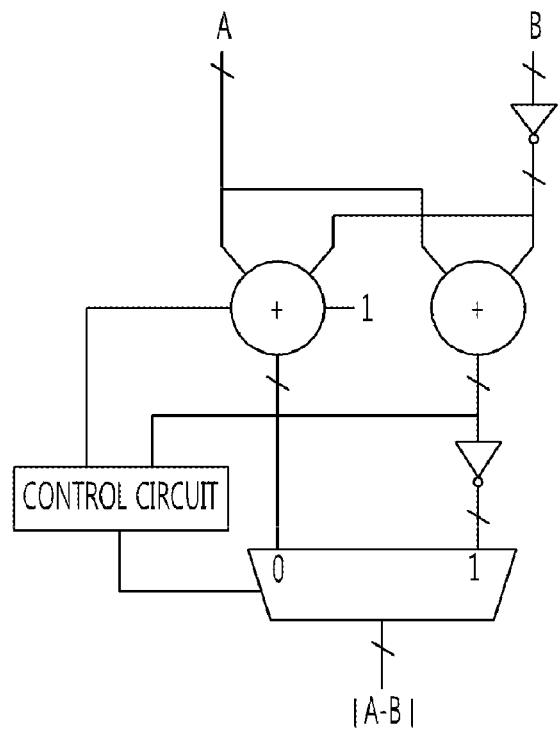
Figure 4:
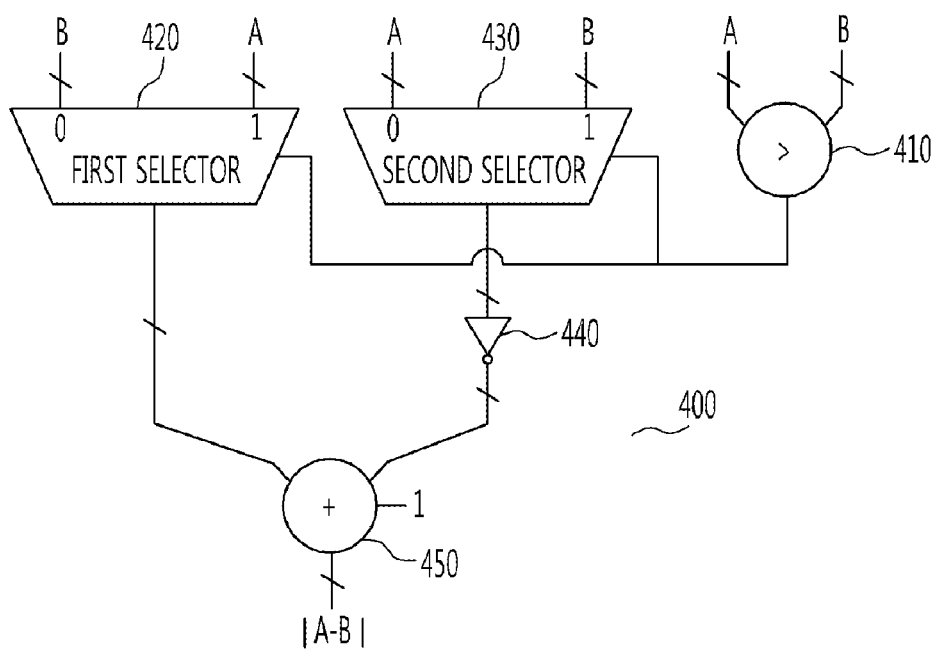
FIG. 4 illustrates the configuration of an apparatus for calculating an absolute difference according to one exemplary embodiment of the present invention.

FIG. 4 illustrates the configuration of an apparatus for calculating an absolute difference according to one exemplary embodiment of the present invention. As illustrated, an apparatus 400 for calculating an absolute difference includes a comparator 410 comparing values of two integers of A and B, first and second selectors 420 and 430 each selecting and outputting A or B according to the comparison results made by the comparator, an inverter 440 complementing (bit-inverting) the selected results of the second selector 430, and an adder 450 adding up the output of the first selector, the output of the inverter 440 and "1".

With respect to operations, first, values of A and B are compared using the comparator 410, and each of the first and second selector 420 and 430 selects and outputs A or B according to the comparison results of the comparator 410. When A is greater than B, the first selector 420 selects and outputs A, and the second selector 430 selects and outputs B. Otherwise, the first selector 420 selects and outputs B, and the second selector 430 selects and outputs A.

Among the input results of the two selectors, the results selected by the second selector 430 are complemented by using the inverter 440, and then are sent to the adder 450. Afterwards, the adder 450 outputs an absolute difference calculation result by adding up the output of the first selector 420, the output of the inverter 440 and "1".

The apparatus for calculating an absolute difference having the above structure according to the present invention uses one adder, so that the number of adders is reduced compared with a conventional apparatus for calculating an absolute difference.

While the comparator is additionally employed in the apparatus for calculating an absolute difference according to the present invention, the use of the comparator enables the calculation of maximum and minimum values which is frequently used in the multimedia computing to be easily implemented.

Figure 5:
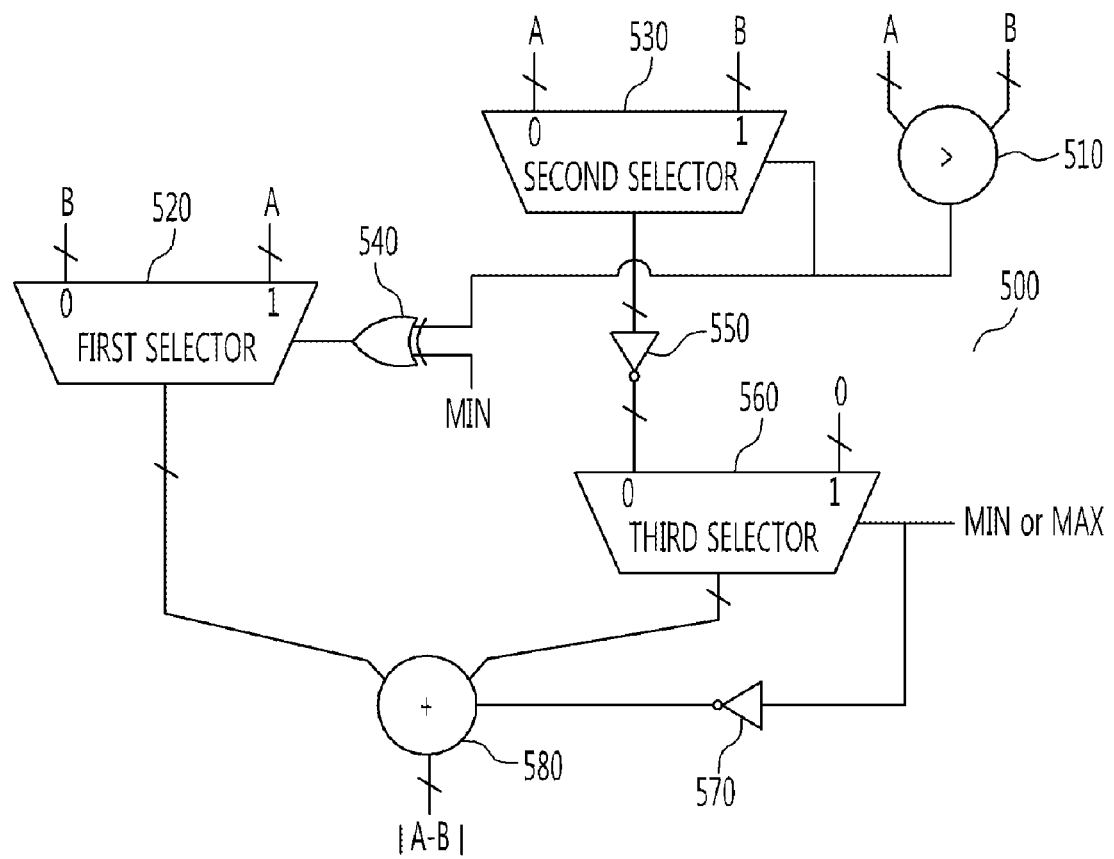
FIG. 5 illustrates the configuration of an apparatus for calculating an absolute difference capable of performing a minimum value and maximum value calculation according to another exemplary embodiment of the present invention.

FIG. 5 illustrates the configuration of an apparatus for calculating an absolute difference capable of performing a minimum value and maximum value calculation on two integers according to another exemplary embodiment of the present invention. As illustrated in FIG. 5, an apparatus 500 for calculating an absolute difference has a similar constitution to that illustrated in FIG. 4 except that it further includes an exclusive logical sum operator 540 and a third selector 550.

Specifically, the apparatus 500 for calculating an absolute difference includes a comparator 510 comparing values of two integers, an exclusive logical sum operator 540 performing an exclusive logical sum operation on comparison results of the comparator 520 and a minimum value (MIN) calculation input, a the first selector 520 selecting and outputting one of the two integers according to the calculation results of the exclusive logical sum operator 540, a second selector 530 selecting and outputting one of the two integers according to comparison results of the comparator 520, a first inverter 550 complementing the output of the second selector 530, a third selector 560 selecting and outputting the value complemented by the inverter 550 or "0" according to a minimum value/maximum value (MIN/MAX) calculation input, a second inverter 570 complementing the MIN/MAX calculation input, and an adder 580 adding up the output of the first selector 520, the output of the third selector 560 and the output of the second inverter 570.

With respect to operations, first, when an absolute difference between two integers of A and B is intended to be calculated, "0" is input to a MIN/MAX calculation input of the third selector 550, and "0" is input to a MIN calculation input of the exclusive logical sum operator 540. In this case, the comparator 510 compares values of the two integers of A and B, and when A is greater than B as a result of the comparison, the first selector 520 selects and outputs A, the second selector 530 selects and outputs B, and the third selector selects and outputs a complemented value of B, i.e., an output of the first inverter 550. Accordingly, the adder 580 adds up the outputs of the first selector 520 and the third selector 560 and a complemented value, i.e. "1", of the MIN/MAX calculation input which is an output of the second inverter 570. That is, the adder 580 ultimately calculates A+(not B)+1, and outputs the calculated results of an absolute value of A−B. When B is greater than A, the operation may be performed in the same manner.

Second, when a maximum value calculation is performed using the apparatus 500 for calculating an absolute difference, a MIN/MAX calculation input that is an input signal of the third selector 560 is input as "1", and a MIN calculation input of the exclusive logical sum operation 540 is input as '0". Here, when A is greater than B as a result of the comparator 510 comparing two integers of A and B, the first selector 520 selects and outputs A, the third selector 560 selects and outputs a constant 0, and the adder 580 ultimately adds up the output of the first selector 520, the output of the third selector 560 and the output of the second inverter 570, i.e., calculates A+0+0 and outputs A. When B is greater than A, the operation works in a similar manner.

Finally, in a minimum value calculation, a MIN/MAX calculation input that is an input signal of the third selector 560 is input as "1", and a MIN calculation input of the exclusive logical sum operator 540 is input as "1" as well. Here, when A is greater than B as a result of the comparator 510 comparing A and B, the first selector 520 selects and outputs B, the third selector 560 selects and outputs a constant 0 and the adder 560 ultimately calculates B+0+0, and outputs B. When B is greater than A, the operation works in a similar manner to the above.

In an apparatus for calculating an absolute difference according to the present invention, an adder and a comparator are used, so that the absolute difference can be calculated with reduced burden on a logic area, and a minimum value and maximum value calculation frequently used in the multimedia computing can be easily implemented.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An apparatus for calculating an absolute difference, comprising:
   a comparator comparing values of two integers;
   an exclusive logical sum operator performing an exclusive logical sum operation on the comparison results of the comparator and a first input control signal;
   a first selector selecting and outputting one of the two integers according to the operation results of the exclusive logical sum operator;
   a second selector selecting and outputting one of the two integers according to the comparison results of the comparator;
   a first inverter complementing the output of the second selector; a third selector selecting and outputting the result value of the first inverter or "0" according to a second input control signal value;
   a second inverter complementing the second input control signal value; and
   an adder adding up the output of the first selector, the output of the third selector and the output of the second inverter;
   wherein the adder outputs one of a minimum value calculation of the two integers, a maximum value calculation of the two integers, and the absolute difference of the two integers based on the first and second input signal.

2. The apparatus of claim 1, wherein the first input control signal instructs the minimum value calculation of the two integers, and the second input control signal instructs the minimum value or maximum value calculation of the two integers.

3. The apparatus of claim 1, wherein when the first and second input control signals are "0", the adder outputs the results of calculating the absolute difference.

4. The apparatus of claim 3, wherein the first selector selects and outputs the greater of the two integers, the second selector selects and outputs the other integer not selected by the first selector, and the third selector selects and outputs the result value of the first inverter.

5. The apparatus of claim 1, wherein when the first input control signal is "0" and the second input control signal is '1', the adder outputs the maximum value of the two integers.

6. The apparatus of claim 5, wherein the first selector selects and outputs the greater of the two integers, and the third selector selects and outputs "0".

7. The apparatus of claim 1, wherein when the first input control signal is "1" and the second input control signal is "1", the adder outputs the minimum value of the two integers.

8. The apparatus of claim 7, wherein the first selector selects and outputs the lesser of the two integers, and the third selector selects and outputs "0".

* * * * *